US011319721B1

(12) United States Patent
Schroeder

(10) Patent No.: US 11,319,721 B1
(45) Date of Patent: May 3, 2022

(54) PORTABLE HOT TUB

(71) Applicant: Michael Schroeder, Madison, WI (US)

(72) Inventor: Michael Schroeder, Madison, WI (US)

( * ) Notice: Subject to any disclaimer, the term of this patent is extended or adjusted under 35 U.S.C. 154(b) by 0 days.

(21) Appl. No.: 17/104,780

(22) Filed: Nov. 25, 2020

(51) Int. Cl.
*E04H 4/00* (2006.01)
*E04H 4/12* (2006.01)
*B60P 3/00* (2006.01)

(52) U.S. Cl.
CPC .............. *E04H 4/0018* (2013.01); *B60P 3/00* (2013.01); *E04H 4/1218* (2013.01); *E04H 4/129* (2013.01)

(58) Field of Classification Search
CPC ......... E04H 4/0018; E04H 4/1218; B60P 3/00
USPC ............................................ 4/494, 546, 592
See application file for complete search history.

(56) References Cited

U.S. PATENT DOCUMENTS

| 4,991,895 A * | 2/1991 | Artho ...................... B60P 3/00 |
| | | 119/512 |
| 9,889,784 B1 * | 2/2018 | Lyles ..................... B62D 63/08 |
| 2005/0081289 A1 * | 4/2005 | Karhumaki ............ A47K 3/007 |
| | | 4/592 |

* cited by examiner

*Primary Examiner* — Tuan N Nguyen
(74) *Attorney, Agent, or Firm* — Casimir Jones, S.C.; Kelly Barton

(57) ABSTRACT

Provided herein are portable hot tubs comprising a hot tub, a frame, and a pivotable wheel assembly comprising a suspension system for adopting three positions, a transport position, a drain position, and a use position.

11 Claims, 9 Drawing Sheets

PORTABLE HOT TUB

FIELD

Provided herein are portable hot tubs and methods of using thereof.

BACKGROUND

The financial investment in a hot tub or spa system and the consequent maintenance costs can be unaffordable for an average consumer. Most hot tubs are installed in a permanent location, often requiring custom construction and attachment to specific electrical service and, therefore are not easily transportable from one location to another. Thus, in order to move the entire hot tub, the electrical and/or attached components usually require complex and time-consuming disassembly at the first location and reassembly at the second location. Some existing portable hot tub systems that rely on inflatable parts, allow for easier and quicker assembly and disassembly compared to conventional permanent hot tubs, however, the user experience with the inflatable hot tubs is less desirable due to the lack of depth and built-in structured seats.

SUMMARY

Provided herein are portable hot tubs comprising a hot tub, a frame, and a pivotable wheel assembly. The hot tub comprises an interior defined by a plurality of side walls, seats, a floor, and a drain.

The frame may comprise an upper horizontal support rail supporting or bracing an upper rim of the plurality of side walls of the hot tub, a lower horizontal support rail, and a tongue assembly. The tongue assembly may comprise a coupler at a distal end for connection to a trailer hitch. The proximal end of the tongue assembly is connected to the lower horizontal support rail of the frame.

The pivotable wheel assembly may comprise a suspension system and at least two wheels. In some embodiments, the wheels are adjustably coupled to the frame by the suspension system wherein the wheels are fully encompassed above or within the frame in a use position and at least partially extendable from the lower horizontal support rail for a drain or a transport position. The suspension system may be operated by non-manual means, pneumatic means, or hydraulic means. In some embodiments, the suspension system further comprises a pump, either electrical or manual, hydraulic or pneumatic or a tank of compressed gas.

In some embodiments, the hot tub further comprises a filter system. The filter system may comprise a filter housing attached to the interior of the hot tub at or below the water level and an interior chamber comprising a filter medium exterior to but in fluid communication with the hot tub interior. In some embodiments, the filter medium is a water filter bag.

Also provided herein are methods for using the portable hot tub disclosed herein. In some embodiments, the methods comprise disconnecting the coupler of the portable hot tub from the trailer hitch of a transport vehicle; placing the tongue on a substantially horizontal surface at the desired location; and raising the suspension system to position the portable hot tub in a use position wherein the lower horizontal support rail and tongue assembly are in contact with the substantially horizontal surface. The methods may further comprise at least one or both of placing the portable hot tub in a transport position by lowering the suspension system and connecting the coupler to the trailer hitch of the transport vehicle; and transporting hot tub to the desired location.

In some embodiments, the methods comprise draining water from the portable hot tub while the portable hot tub is in a use position wherein the suspension system is raised and the lower horizontal support rail and tongue assembly are in contact with a substantially horizontal surface; and placing the hot tub in a drain position by lowering the wheels and raising the horizontal support rail off the substantially horizontal surface by lowering the suspension system while the tongue remains at least partially in contact with the substantially horizontal surface; and draining remaining water from the hot tub. In some embodiments, the methods further comprise placing the portable hot tub in a transport position by connecting the coupler to the trailer hitch.

Other aspects of the invention will become apparent by consideration of the detailed description and accompanying drawings.

Definitions

Unless otherwise defined, all technical terms used herein have the same meaning as commonly understood by one of ordinary skill in the art. In case of conflict, the present document, including definitions, will control. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of," and "consisting essentially of," the embodiments or elements presented herein, whether explicitly set forth or not.

To facilitate understanding of the invention, a number of terms are defined below.

"Hitch," "trailer hitch," and "tow hitch" are used interchangeably herein to describe a device attached to the chassis of a vehicle for towing or attachment to a coupler on a trailer or other vehicle being transported. The hitch can take any form known in the art (e.g., tow ball, tow pin, and tow hook).

"Hot tub" describes a vessel for holding and heating water for use in hydrotherapy, relaxation or pleasure. Hot tubs can also be referred to as spas, jetted tubs, or by the trade name Jacuzzi. The hot tub can be made out of a variety of materials, including, acrylic, wooden, stainless steel, fiberglass, vinyl or PVC. The hot tub may be constructed as a single piece or assembled in different sections. The water may be heated using a number of systems, including but not limited to, electric, natural gas, or propane heaters, wood, or solar hot water systems.

"Hydraulic," as used herein, relates to operations which use movement of pressurized fluids to function. The fluids may consist of, for example, water, hydraulic fluids, or oil.

"Pneumatic," as used herein, relates to operations using pressurized air or gas (e.g. nitrogen) to transmit force and energy.

DETAILED DESCRIPTION

Illustrative embodiments of the invention are shown in the figures. It should be understood that the invention is not limited to these particular examples.

Portable hot tubs and related methods as described herein facilitate a traditional hot tub experience for a user without the need of permanent installation allowing for short-term use, rental units, or ease of transfer when moving. Hot tubs of the present disclosure improve draining and maintenance with the ability to be placed in a drain position and ease of use of the filter system as described herein. In addition, the portable hot tubs described herein have the appearance of a free-standing hot tub with the lower support rail supported on a horizontal surface, removing premature wear and stress on the suspension system and pivotable wheel assembly of the portable hot tub.

Figure 1A:
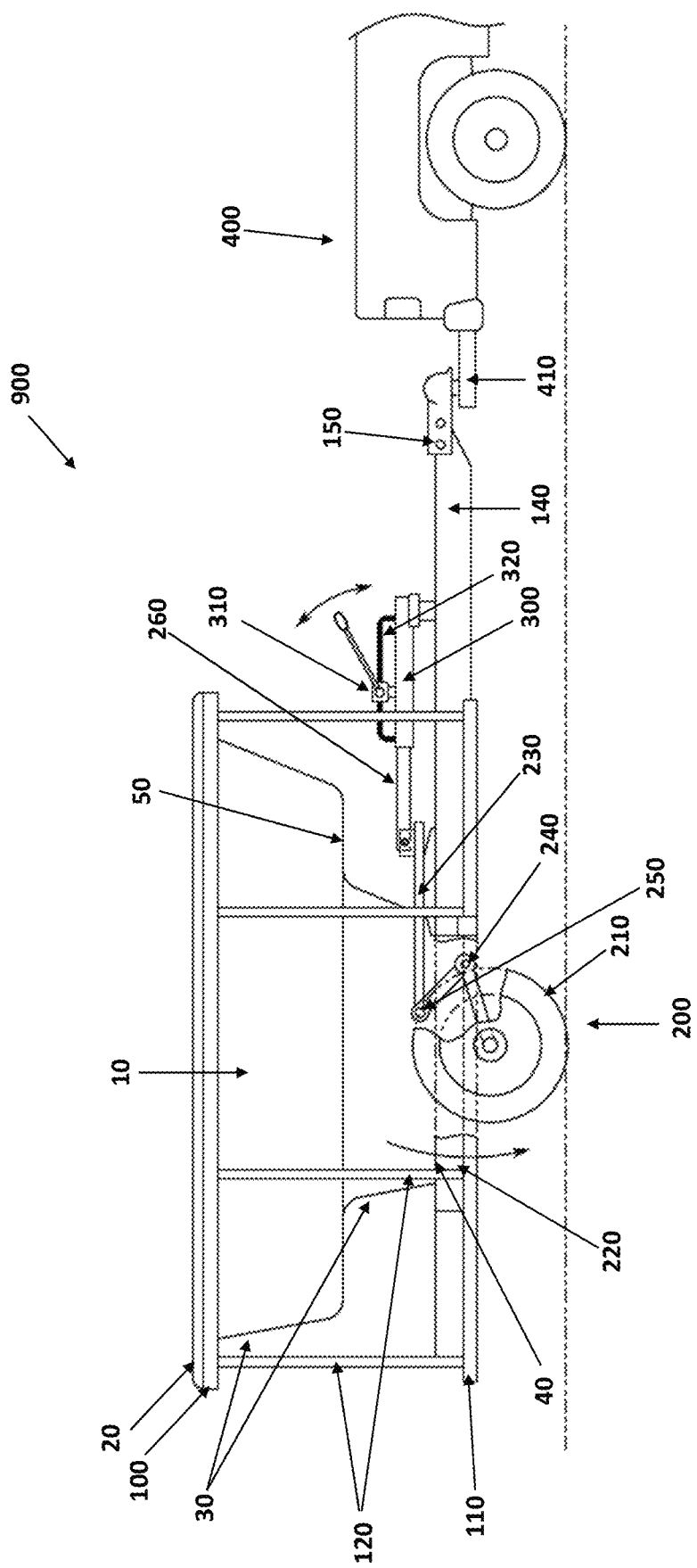
FIGS. 1A-1C show alternative side views of an exemplary portable hot tub where the suspension system comprises a manual hydraulic or pneumatic pump and single cylinder in transport position with a transport vehicle (FIG. 1A), use position (FIG. 1B) and drain position (FIG. 1C).
Figure 1B:
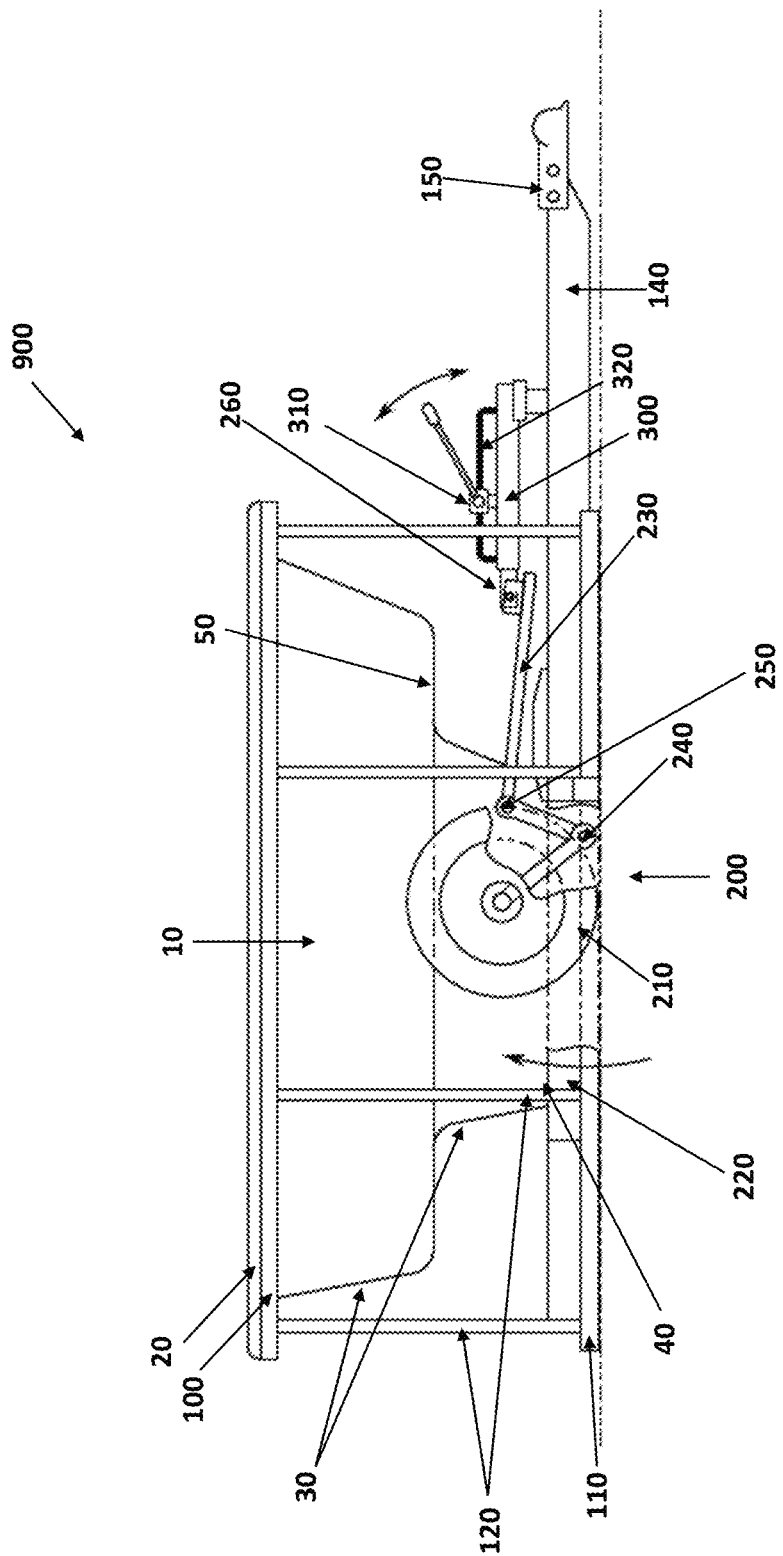
Figure 1C:
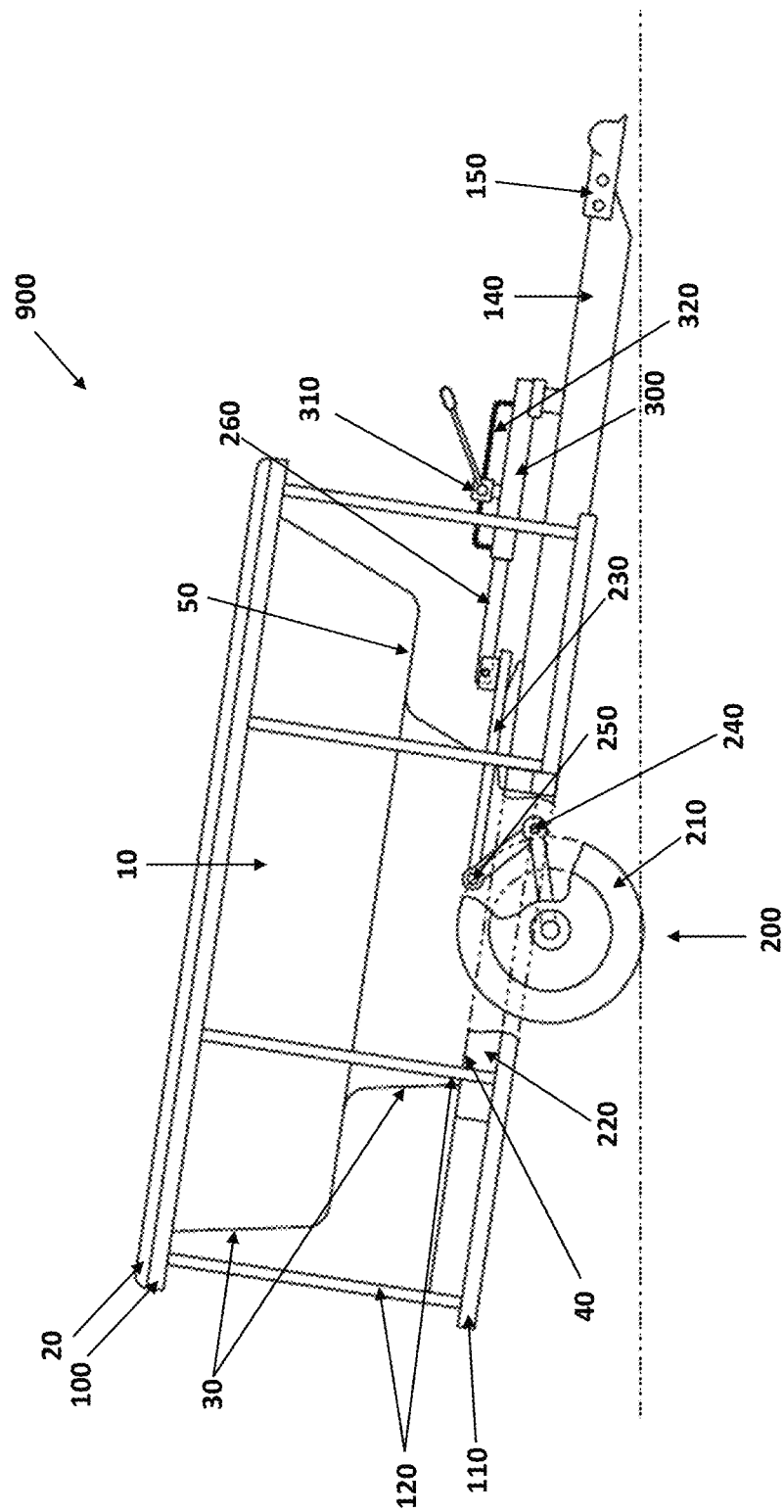
Figure 6A:
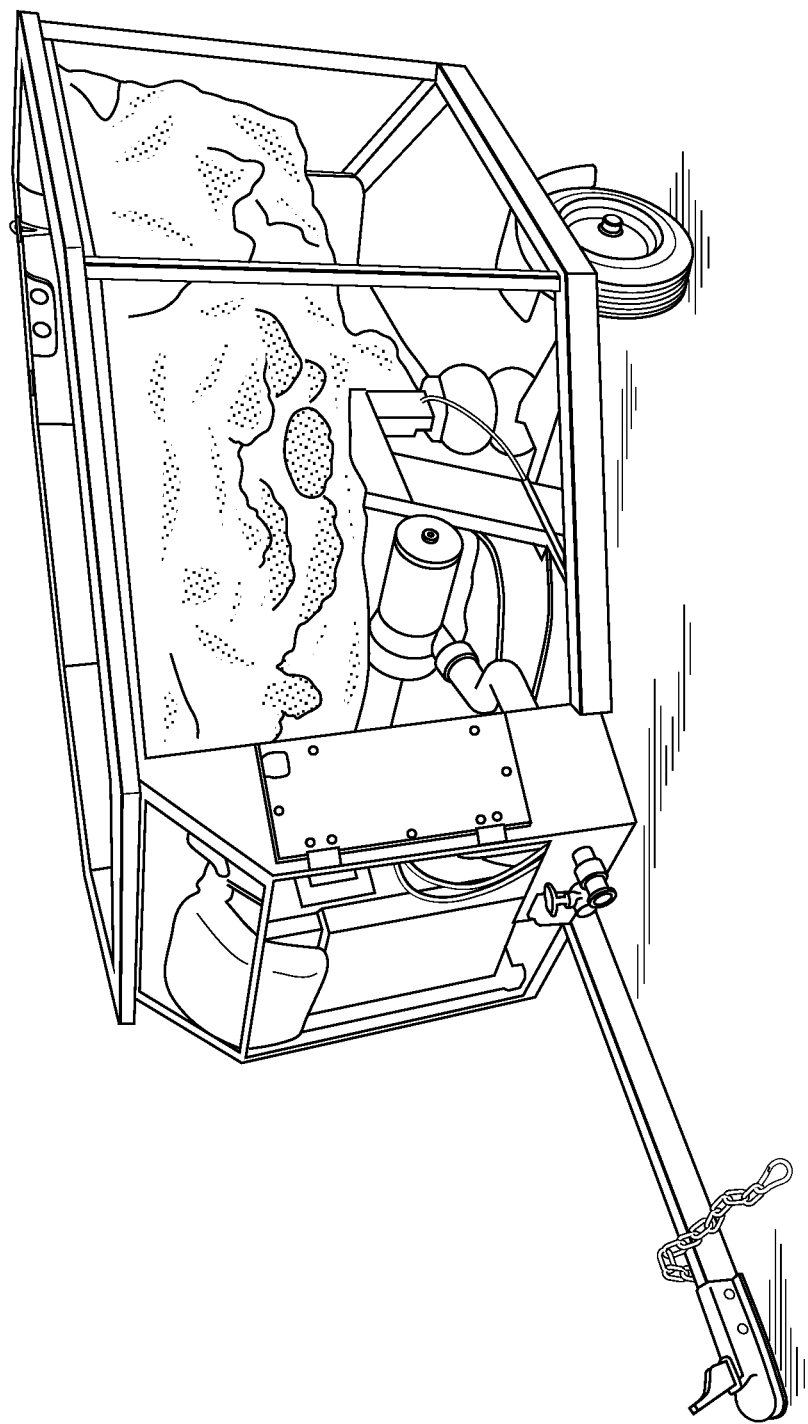
FIGS. 6A and 6B are photographs of an exemplary portable hot tub in the drain position with (FIG. 6B) and without (FIG. 6A) an outer wrapping around the frame. In this embodiment, the portable hot tub comprises a suspension system having air suspension bags and a storage compartment operating equipment.

An exemplary portable hot tub 900 is shown in the three positions for transport, use, and draining in FIGS. 1A-1C, respectively. A single side is shown, but as will be evident to one of skill in the art, the opposing side have the same configuration. The portable hot tub comprises a hot tub 10, a frame having an upper horizontal support rail 100 and a lower horizontal support rail 110, and a pivotable wheel assembly 200 comprising a suspension system and at least two wheels 210. Hot tub 10 comprises a plurality of side walls 30 and a floor 40 which defines the interior of the hot tub 10. The upper edges of the plurality of side walls form a hot tub upper rim 20 which extends over at least a portion of the upper horizontal support rail 100. The plurality of side walls 30 may comprise both upper side walls and lower side walls. The plurality of upper side walls may form a greater periphery than the lower side walls to define bench seats 50 within the interior of the hot tub. Hot tub 10 may comprise a reinforcing structure exterior to the hot tub interior to support bench seating and connect the lower portion of the upper side walls to the lower side walls (not shown). Hot tub 10 may be formed as a one-piece molded fiber glass structure and may take on any shape including, but not limited to, a square, a square with one or more cut corners, a rectangle, a circle, a hexagon, an octagon, elliptical, and the like. Hot tub 10 may further comprise insulation or insulating materials around the exterior of side walls 30, seats 50, and floor 40 to improve energy and heating efficiency, one embodiment of which is shown in FIG. 6A.

The frame comprises upper horizontal support rail 100, lower horizontal support rail 110, a plurality of vertical support rails 120, and a tongue assembly 140. The plurality of vertical support rails 120 are configured and connected to upper and lower horizontal support rails (100 and 110) at spaced intervals which prevent horizontal movement between upper and lower horizontal support rails (100 and 110) during movement and use. The upper and lower horizontal support rails (100 and 110) may be of various widths to expand the periphery of hot tub 10 beyond the hot tub upper rim 20 as desired. As one of skill in the art will appreciate, the shape and/or circumference of the frame and its various components and be configured for various shapes and sizes of hot tubs.

The frame may further comprise horizontal cross bars 220 connecting the lower horizontal support rail 110 from side to side and front to back and/or side support rails 280. Cross bars 220 bars and/or side support rails 280 may provide support for other components of the portable hot tub, including the pivotable wheel assembly 200 (e.g. wheels 210 and suspension system components) and floor 40 of the hot tub. As one skilled in the art will appreciate, the location, number and orientation of the cross bars and/or side support rails are determined by the hot tub shape and suspension system components to which they are attached. The tongue assembly 140 extends from the lower horizontal support rail 110 and comprises a coupler 150 at a distal end for connection to a trailer hitch 410.

Figure 6B:
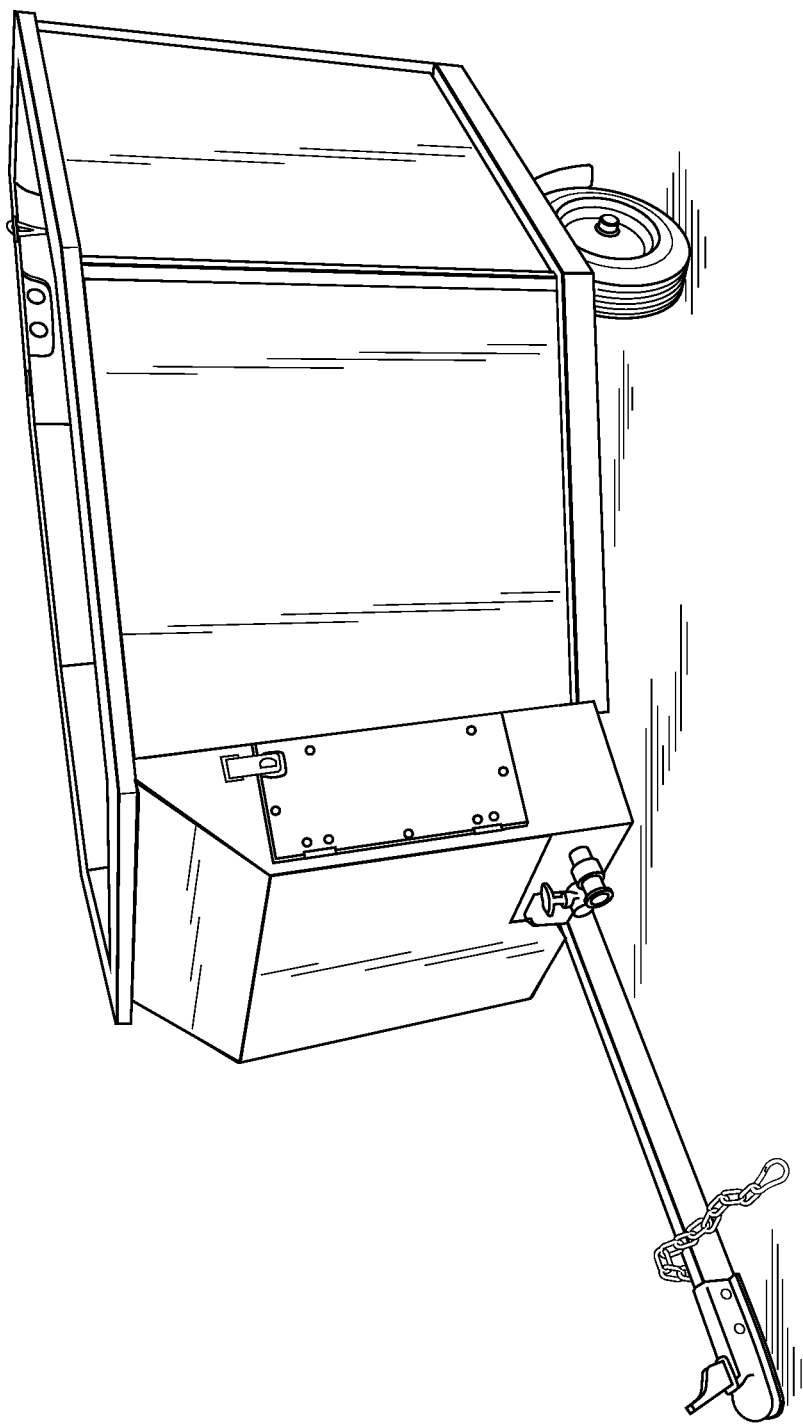

The frame may allow or comprise attachment to water heating and water filtration equipment, including, water pumps, heater, propane tanks, fluid conduits, water filter systems and the like. The frame may comprise a storage compartment for such equipment. Alternatively, portable hot tub 900 may further comprise an outer wrapping around the frame from the top of the upper horizontal support rail 100 to the bottom of the lower horizontal support rail 110 to conceal and protect hot tub 10 and other components (e.g. water heating, water filtration equipment, pivotable wheel assembly 200, suspension system), as shown in FIGS. 6A and 6B. The frame may further comprise stairs or similar structures. The stairs may be mounted on the exterior of the frame and provide access to the interior of hot tub 10 for the users. The frame may additionally comprise attachment points to affix a lid or cover which spans across the surface of the hot tub about and above the upper rim 20.

The pivotable wheel assembly 200 comprises a suspension system and at least two wheels 210. The wheels 210 are adjustably coupled to the frame by the suspension system. The suspension system may comprise springs, shock absorbers, any other linkages (e.g. axle, pivotable wheel support assembly) or components (actuating means) to connect the frame of portable hot tub 900 to its wheels while allowing and facilitating relative motion between the two. Wheels 210 are fully encompassed above or within the frame in a use position (FIG. 1B). Thus, when portable hot tub 900 comprises an outer wrapping, wheels 210 and related suspension system are invisible from the outside. Thus, wheels 210 extend and retract within the periphery of portable hot tub 900 as defined by the lower horizontal support rail 110. Wheels 210 are at least partially extendable below the lower horizontal support rail 110 for a drain or a transport position (FIGS. 1A and 1C). Thus, the suspension system allows the user to selectively place the wheels 210 above or below the lower horizontal support rail 110.

The suspension system may be operated by a number of actuating systems or means as known in the art including but not limited to hydraulic, pneumatic, electric or electromechanical means. In some embodiments, the suspension system comprises a rod-style linear actuator or cylinder operated by well-known means including, but not limited to, pneumatic, hydraulic and electromechanical means. In some embodiments, the suspension system comprises air bags, also referred to air bellows or air springs, which are operated by small, electric or manual air compressors or pneumatic pumps or a tank of compressed gas. In some embodiments, the suspension system further comprises a pump, electric or manual, or a tank of compressed gas.

In some exemplary embodiments, as shown in FIGS. 1A-1C, the suspension system may comprise a manual hydraulic or pneumatic pump 310 and a single cylinder 300 with corresponding fluid line 320. Cylinder 300 is coupled to an actuating arm cylinder 230 of each pivotable wheel assembly 200 through a single extension arm 260. As actuating arm 230 is extended and retracted by hydraulic or pneumatic cylinder 300 and extension arm 260, pivot axis point 250 changes position about fixed pivot point 240 of the pivotable wheel support assembly, thereby raising and lowering wheel 210. The manual pump 310 is located outside of the frame of the portable hot tub, and connected to the tongue assembly 140, for access by the operator.

Figure 2:
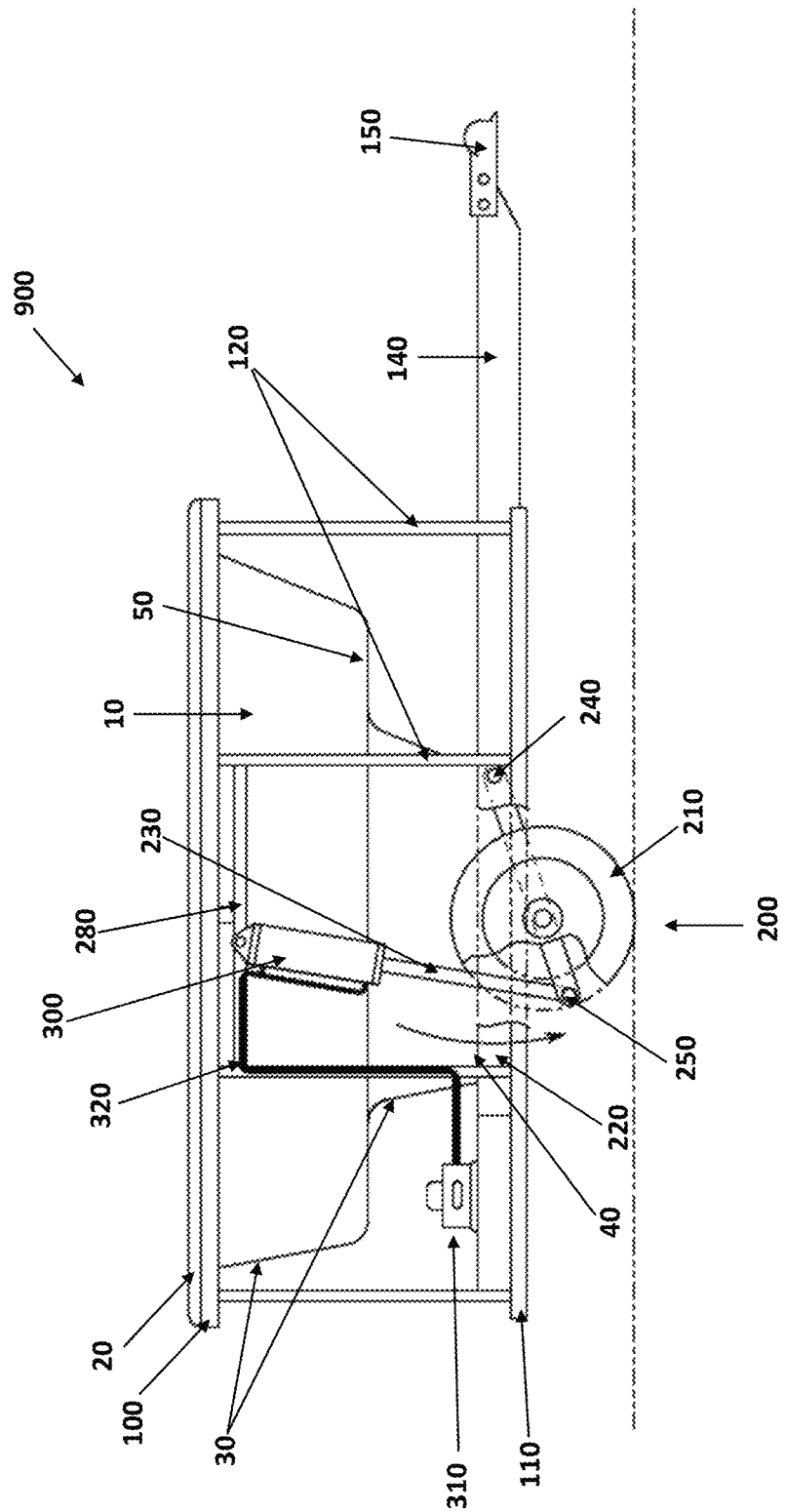
FIG. 2 shows a side view of an exemplary portable hot tub where the suspension system comprises an electric hydraulic or pneumatic pump and multiple cylinders in transport position. Transport vehicle (not shown) is as shown in FIG. 1A.

Alternatively, the suspension system may comprise a cylinder 300 for each of the at least two wheels 210. FIG. 2 shows an alternate exemplary embodiment of portable hot tub 900 having a suspension system comprising electric hydraulic or pneumatic pump 310 and a hydraulic or pneumatic cylinder 300 for each pivotable wheel assembly 200. When multiple cylinders are used, they may be connected by fluid conduits to the same pump to ensure the frame is raised or lowered evenly in a horizontal plane. Pump 310 is in fluid communication with each of the cylinders 300 which are connected through actuating arm 230 to pivot axis point 250 of pivotable wheel support assembly. Pivot axis point 250 changes position about fixed pivot point 240 of the pivotable wheel support assembly. Similar to the single cylinder system, as actuating arm 230 is extended or retracted, pivot axis point 250 changes position about fixed pivot point 240, thereby raising or lowering wheel 210. Pump 310 may be connected to a horizontal cross bar connected between the lower horizontal support rail 110.

Figure 3:
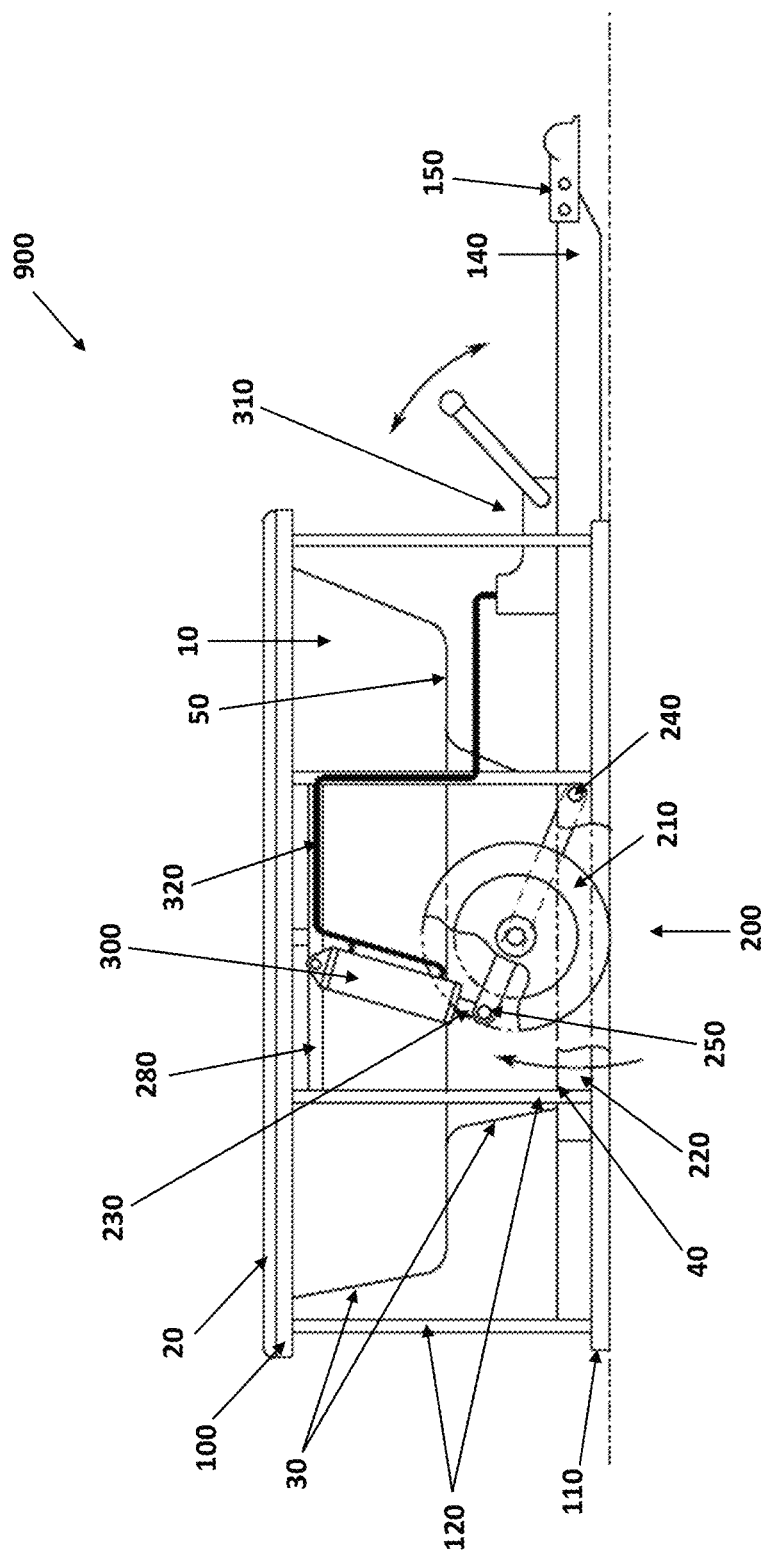
FIG. 3 shows a side view of an exemplary portable hot tub where the suspension system comprises a manual hydraulic or pneumatic pump and multiple cylinders in use position.
Figure 4:
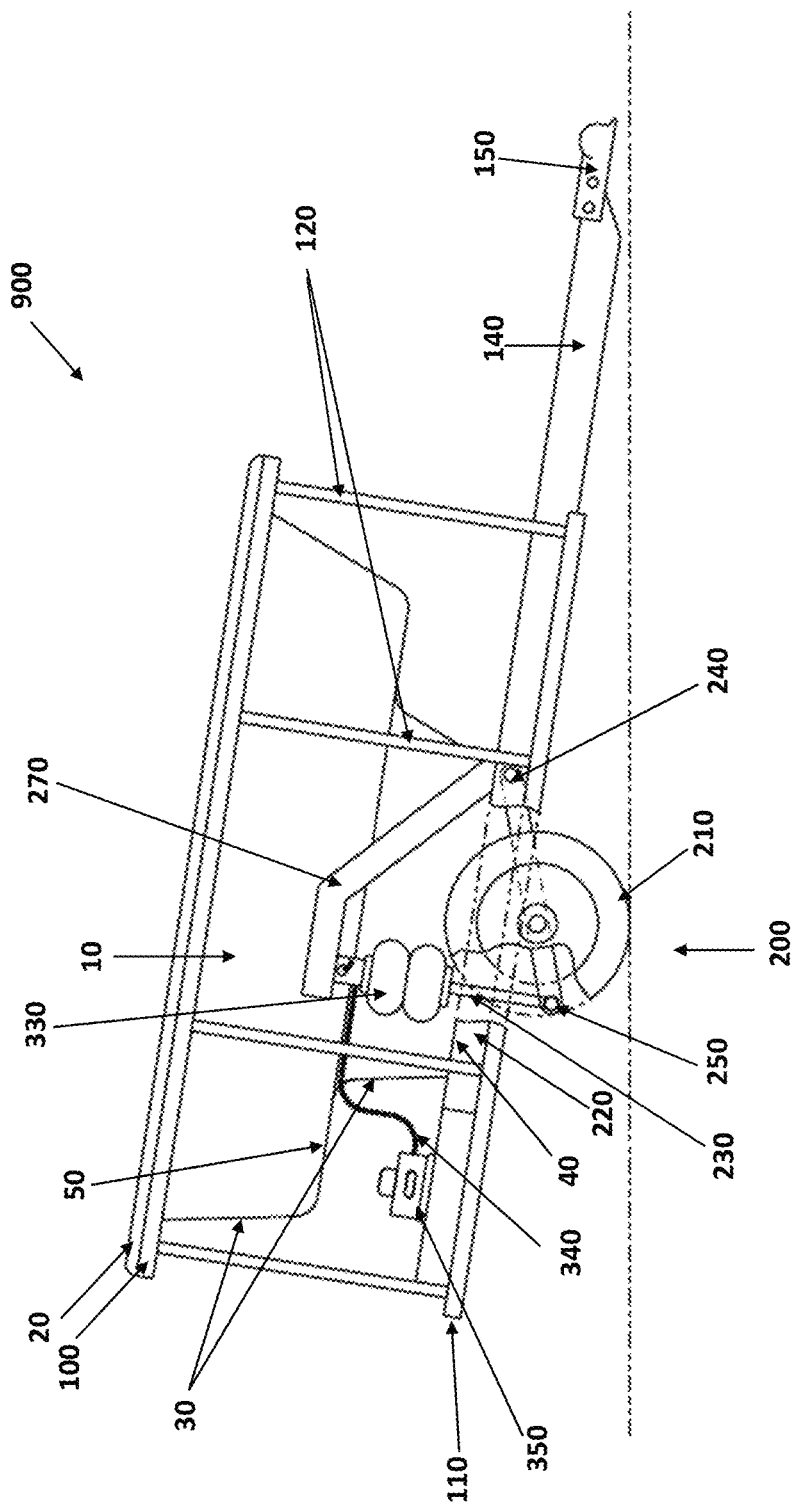
FIG. 4 shows a side view of an exemplary portable hot tub where the suspension system comprises air suspension bags and an electric pump in drain position.

FIG. 3 shows an alternative exemplary embodiment in which the electric pump FIG. 2 is replaced by a manual pump 310 connected to the tongue assembly 140. As shown in FIG. 3 and consistent with FIG. 2, actuating arm 230 is retracted when lower horizontal support rail 110 is on the substantially horizontal surface. FIG. 4 shows yet another alternative exemplary embodiment where the suspension system comprises pneumatic suspension bag 330 operated by pneumatic pump 350 or an air compressor. In this embodiment, the actuating mechanism is due to the inflation and deflation of air suspension bags 330 attached to an extension arm 270 which raises and lowers the pivot axis point, as described above. The airbags may be connected via conduits 340 with the same air compressor or pneumatic pump 350 to ensure the frame is raised or lowered evenly in a horizontal plane.

As shown in FIGS. 2 and 4, the entirety of the suspension system may be encompassed within the periphery defined by the upper and lower horizontal support rails (100 and 110). The electric pumps may be mounted to the frame such that the controls are exposed to the user or alternatively, a control panel may be affixed to the outer frame wrapping or operated by a controlled in communication with the pump by wired or wireless (Bluetooth) means. The manual pumps as shown in FIGS. 1A-C and may be mounted to the lower horizontal support rail 110, cross bar 220, and/or tongue assembly 140 for access by the user.

Figure 5:
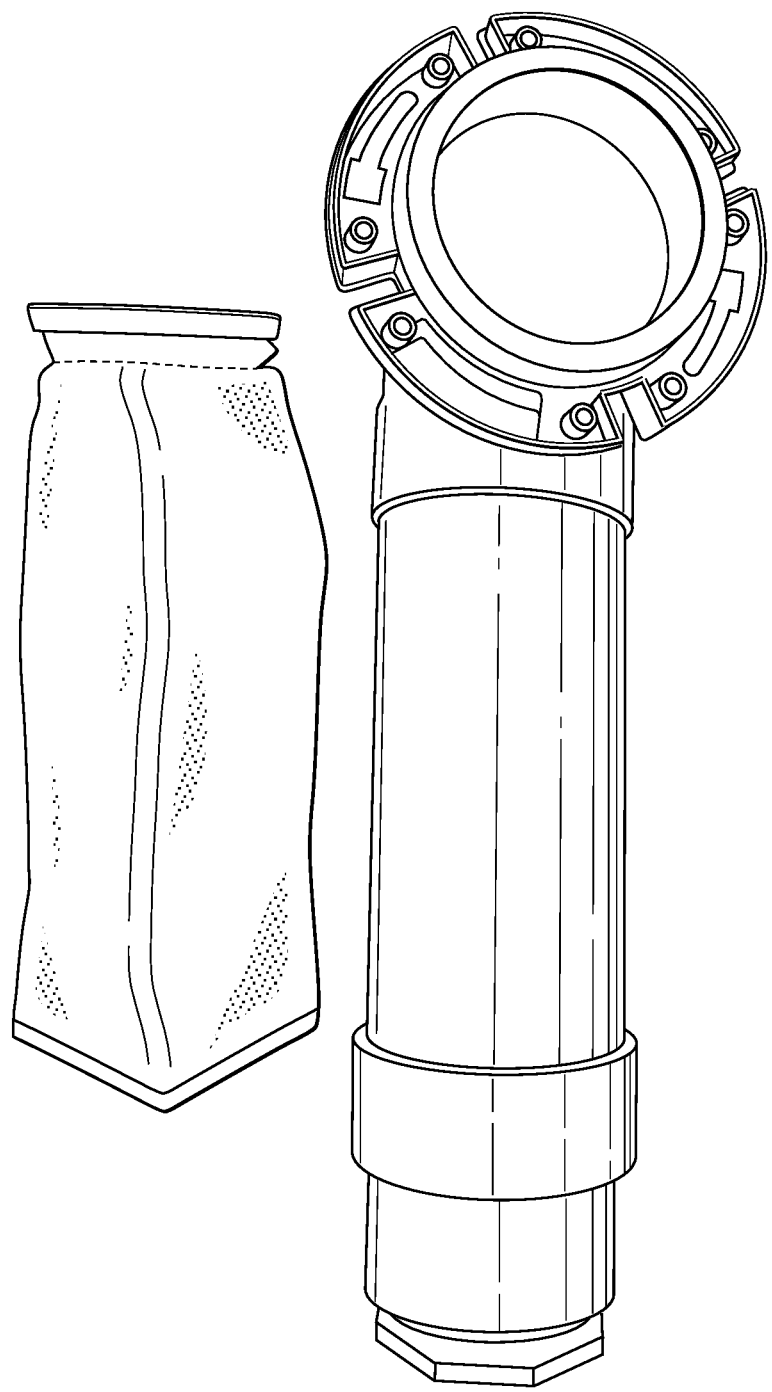
FIG. 5 shows a photograph of an exemplary filter system for use in the portable hot tub described herein. The filter housing comprises an interior chamber (right) in which a filter bag (left) is placed inside.

Portable hot tub 900 may further comprise a water pump and water filtration system. In some embodiments, portable hot tub 900 comprises a filter system comprising a filter housing attached to the interior of hot tub 10 at or below water level having an interior chamber comprising a filter medium exterior to but in fluid communication with the interior of hot tub 10. The filter medium may comprise any convention filter medium, including but not limited to, filter bags, paper or permeable disks or pads, and the like. In some embodiments, the filter medium is a water filter bag (FIG. 5). The filtration system allows the filter to be inexpensive and/or disposable and can be easily changed between each use, which is not the case for conventional hot tub filter systems.

As shown in FIG. 1, portable hot tub 900 described herein may adopt three positions relative to the state of the suspension system and connection to a transport vehicle 400. To transport portable hot tub 900 described herein, the suspension system is lowered, such that wheels 210 extend beyond the lower horizontal support rail 110 and coupler 150 is connected to trailer hitch 410 of the transport vehicle 400. Following arrival at a desired location, portable hot tub 900 is positioned in the desired location having a substantially horizontal surface, coupler 150 is disconnected from trailer hitch 410 of transport vehicle 400, and the suspension system is raised to position lower horizontal support rail 110 in contact with the substantially horizontal surface, thus placing portable hot tub 900 in use position.

As mentioned above, another advantage to the portable hot tub described herein is ease of transfer to another location. A majority of the water is drained from the portable hot tub while in the use position in which the suspension system is raised and lower horizontal support rail 110 and tongue assembly 140 are in contact with the substantially horizontal surface at the desired location. Portable hot tub 900 is then placed in a drain position by lowering wheels 210 and raising lower horizontal support rail 110 off the substantially horizontal surface by lowering the suspension system while tongue 140 remains at least partially in contact with the substantially horizontal surface. Thus, a significant benefit of this invention is that portable hot tub 900 can be placed in a drain position allowing any remaining water to be removed and thus, avoiding freezing and/or contamination, as well as facilitating cleaning and sanitization, before transporting to a newly desired location. Subsequent to draining coupler 150 can be attached to hitch 410 of a transport vehicle 400 for transport to the next desired location.

It is understood that the foregoing detailed description and accompanying figures are merely illustrative and are not to be taken as limitations upon the scope of the disclosure, which is defined solely by the appended claims and their equivalents.

Various changes and modifications to the disclosed embodiments will be apparent to those skilled in the art and may be made without departing from the spirit and scope thereof.

I claim:

1. A portable hot tub, comprising:
   a hot tub comprising an interior defined by a plurality of side walls and a floor, and a drain;

a frame comprising an upper horizontal support rail supporting an upper rim of the plurality of side walls of the hot tub, a lower horizontal support rail, and a tongue assembly comprising a coupler at a distal end for connection to a trailer hitch; and a pivotable wheel assembly comprising a suspension system and at least two wheels, wherein the wheels are adjustably coupled to the frame by the suspension system wherein the wheels are fully encompassed above or within the frame in a use position and at least partially extendable from the lower horizontal support rail for a drain or a transport position.

2. The portable hot tub of claim 1, wherein the tongue assembly is connected to the lower horizontal support rail of the frame.

3. The portable hot tub of claim 1, wherein the suspension system is operated by non-manual means.

4. The portable hot tub of claim 1, wherein the suspension system is operated by pneumatic or hydraulic means.

5. The portable hot tub of claim 1, wherein the suspension system further comprises a pump or a tank of compressed gas.

6. The portable hot tub of claim 1, wherein the portable hot tub further comprises a filter system comprising a filter housing attached to the interior of the hot tub at or below water level and an interior chamber comprising a filter medium exterior to but in fluid communication with the hot tub interior.

7. The portable hot tub of claim 6, wherein the filter medium is a water filter bag.

8. A method for delivering the portable hot tub of claim 1 to a desired location, comprising:

disconnecting the coupler of the portable hot tub from the trailer hitch of a transport vehicle;

placing the tongue on a substantially horizontal surface at the desired location; and raising the suspension system to position the portable hot tub in a use position wherein the lower horizontal support rail and tongue assembly are in contact with the substantially horizontal surface.

9. The method of claim 8, further comprising at least one or both of:

placing the portable hot tub in a transport position by lowering the suspension system and connecting the coupler to the trailer hitch of the transport vehicle; and transporting the portable hot tub to the desired location.

10. A method for draining the portable hot tub of claim 1, comprising:

draining water from the portable hot tub while the portable hot tub is in a use position wherein the suspension system is raised and the lower horizontal support rail and tongue assembly are in contact with a substantially horizontal surface; and placing the hot tub in a drain position by lowering the wheels and raising the horizontal support rail off the substantially horizontal surface by lowering the suspension system while the tongue remains at least partially in contact with the substantially horizontal surface; and draining remaining water from the hot tub.

11. The method of claim 10, further comprising placing the portable hot tub in a transport position by connecting the coupler to the trailer hitch.

* * * * *